Feb. 10, 1942.                C. P. DEIBEL                2,272,907
FLASHLIGHT AND BATTERY UNIT THEREFOR
Filed Oct. 22, 1940                    2 Sheets-Sheet 1

INVENTOR.
CYRIL P. DEIBEL
BY Hull, West & Chitton
ATTORNEYS.

Feb. 10, 1942.  C. P. DEIBEL  2,272,907
FLASHLIGHT AND BATTERY UNIT THEREFOR
Filed Oct. 22, 1940  2 Sheets-Sheet 2

INVENTOR.
CYRIL P. DEIBEL
BY Hull, West & Chilton
ATTORNEYS.

Patented Feb. 10, 1942

2,272,907

UNITED STATES PATENT OFFICE 2,272,907

FLASHLIGHT AND BATTERY UNIT THEREFOR

Cyril P. Deibel, Lakewood, Ohio

Application October 22, 1940, Serial No. 362,212

3 Claims. (Cl. 240—10.61)

This invention relates to certain new and useful improvements in flashlights and battery units therefor and more particularly to a flashlight unit which will eliminate the necessity for a flashlight case altogether. Conventional flashlights now generally known usually comprise a case to receive one or more dry cells and a head removably attached to the case, the head carrying a lamp, reflector, and lens and suitable electrical connections for connecting the lamp with the dry cells. With the conventional flashlight construction any leakage of the cells causes corrosion, and when the time comes to change the batteries considerable difficulty is frequently experienced in removing the corroded dry cells from the case usually resulting in destruction of the case altogether.

One of the objects of this invention therefore is to obviate this difficulty due to corrosion of the dry cells within the case by eliminating the conventional case and providing a dry cell structure or battery unit which may be detached from the head, discarded and replaced by a new dry cell unit.

Another object of the invention is to provide a battery unit for flashlights which is self-contained and which is adapted to detachably receive a flashlight head and which may be discarded when desired, the battery unit providing the handle for the flashlight.

Another object of the invention is to provide a dry cell unit which is leak proof and of rugged and dependable construction and which can be economically manufactured in quantity production.

Another object of the invention is to eliminate the necessity for the conventional switch. This is accomplished by bringing the cell unit into direct contact with the lamp when desired and to provide means for preventing accidental movement of the cell unit relative to the head.

Figure 2:
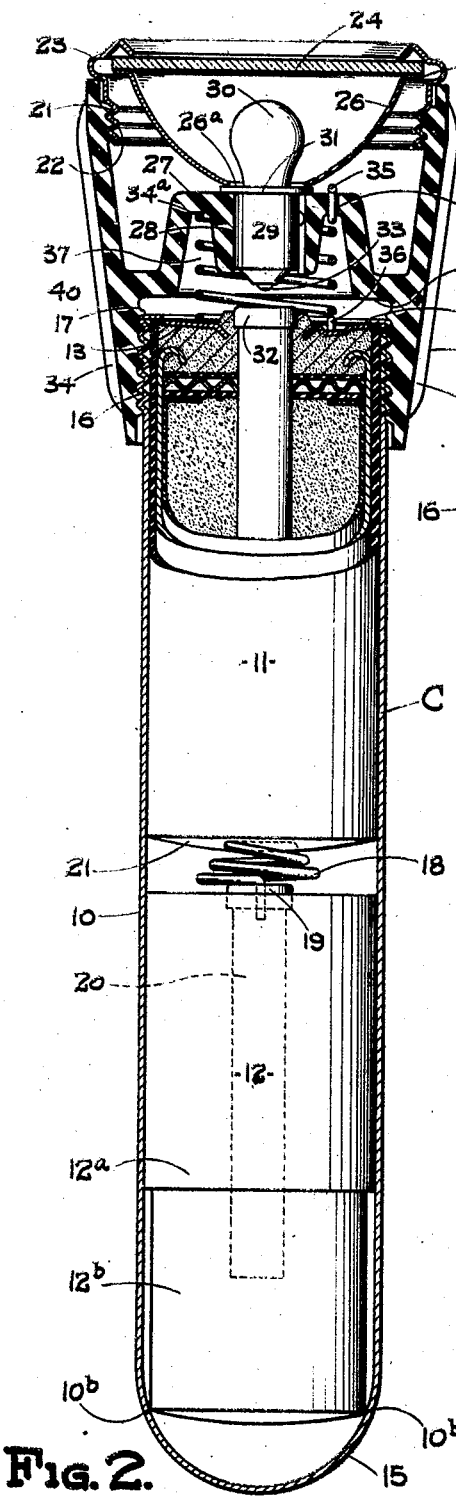
Figure 3:
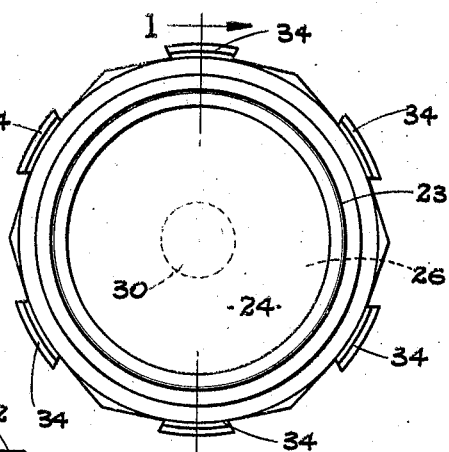
Figure 1:
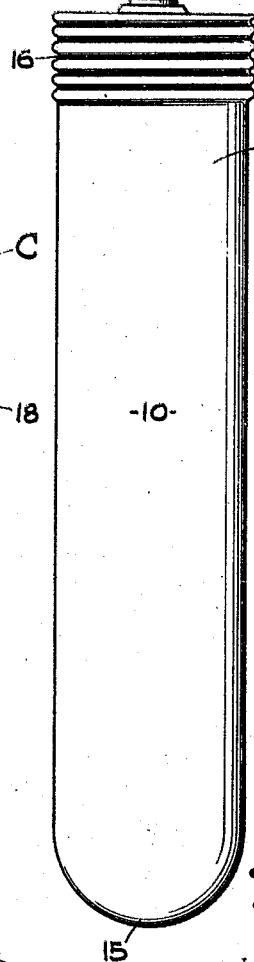
Figure 4:
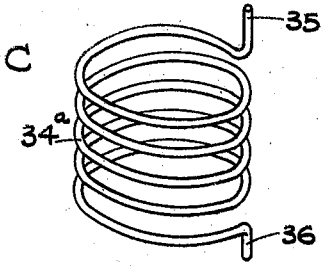
Figure 5:
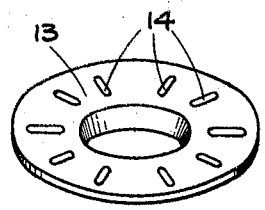
Figure 6:
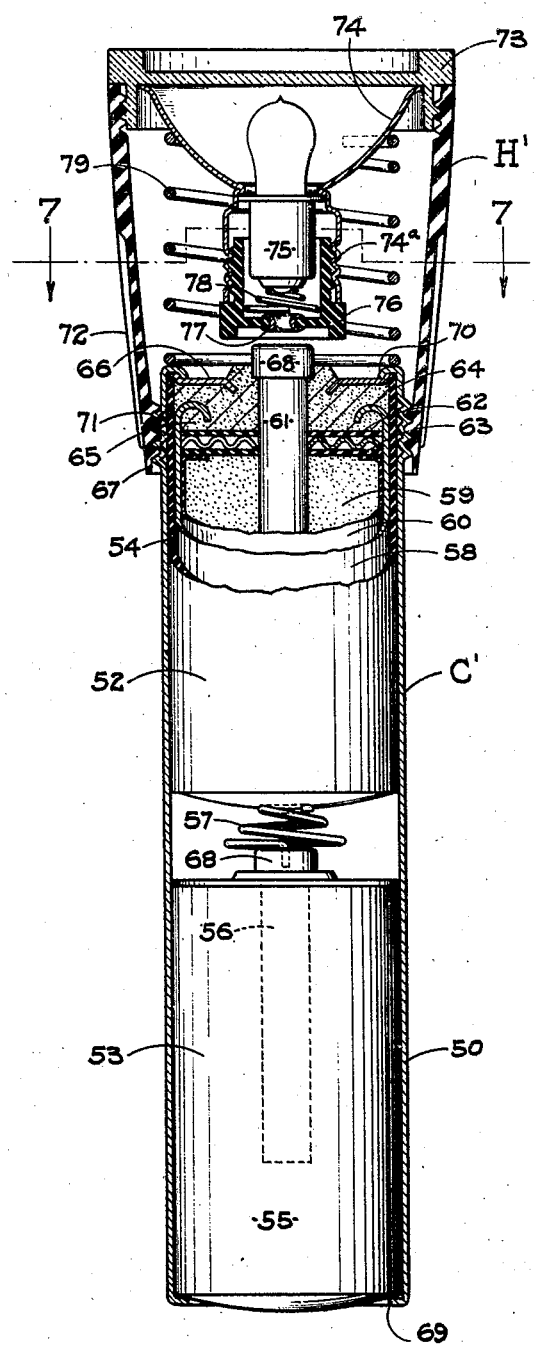
Figure 7:
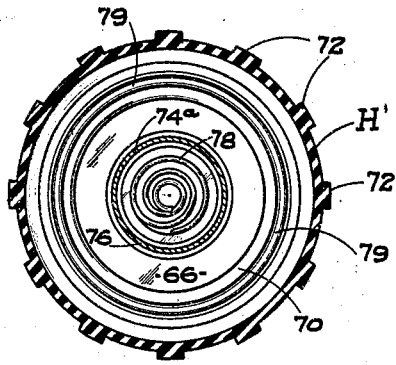
Figure 8:
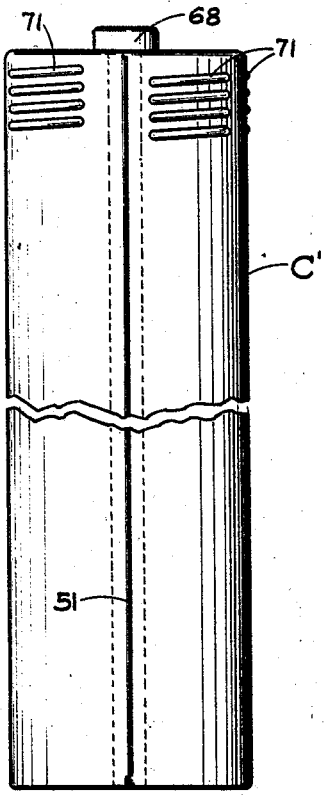

The various features of novelty whereby my invention is characterized will be hereinafter pointed out; but, for a full understanding of my invention and of its objects and advantages, reference may be had to the following detailed description taken in connection with the accompanying drawings, wherein Fig. 1 is a view in side elevation of my improved dry cell unit per se; Fig. 2 is a central vertical section through an assembled flashlight incorporating the features of my improvement; Fig. 3 is an end elevation of Fig. 2, looking towards the head or lamp end of the flashlight; Fig. 4 is a perspective detail view of the coil spring mounted between the head and cell unit to prevent accidental movement between these members; Fig. 5 is a perspective detail of the metal disk or cover for the dry cell unit; Fig. 6 is a central vertical sectional view of a modified form of flashlight and battery unit therefor; Fig. 7 is a horizontal sectional view on the line 7—7 of Fig. 6 and Fig. 8 is a view in side elevation of the battery unit attached from the flashlight head.

The flashlight construction herein disclosed comprises two principal members hereinafter referred to generally as the head H and cell unit C. As best illustrated in Fig. 2, the cell unit C here shown comprises a container 10 formed of any suitable material and which is preferably of a diameter and length suitable to receive two dry cells designated 11 and 12, but it is to be clearly understood that the container 10 may be made of a size or shape suitable for receiving any desired number of dry cells without departing from the spirit of my invention.

The dry cells 11 and 12 may be of a construction identical with the cell disclosed in my United States Patent No. 2,079,495 with the exception of the metal disk or cover 13 which is supplied with a plurality of radially spaced depressions 14 the purpose of which will hereinafter appear.

The container 10 is preferably an extruded round zinc can having one end closed and somewhat bullet shaped, as shown at 15, and its other end open and supplied with an external thread 16 which is received by an internal thread 17 formed in the skirt portion of the head H. The dry cells 11 and 12 are inserted within the container 10 in a carbon to zinc relation or, in other words, in series with one another by means of a helical spring 18. One end of this spring is received by a hole drilled in the metal cap 19 on the carbon electrode 20 of the dry cell 12 in the manner shown in Fig. 2, while its other end bears against the zinc bottom 21 of dry cell 11. The cell unit C is preferably assembled as follows: Dry cell 12 carrying the helical spring 18 is inserted endwise within the container 10 and then the dry cell 11 is inserted endwise within the container until its zinc bottom 21 comes into contact with the spring. A slight pressure is then exerted upon the cell 11 to move it toward cell 12, thus slightly compressing the spring 18 and with the cells retained in this position within the container 10 with the spring 18 slightly compressed, the open end of the container is spun over as at 10ª to thereby hold the cells 11 and 12 within the container. It will be noted from an inspection of Fig. 1 that the lower end of insulating jacket 12ª of cell 12 is removed or cut away to permit the metal shell 12ᵇ to contact the semispherical end 15 of the outer container 10 as indicated at 10ᵇ.

Referring now in detail to the head H and for the present to Fig. 2, the head preferably comprises a metal casting supplied with an internal thread 17 in its skirt portion for the purpose of receiving the threaded end of cell unit C as before described. The head is further provided with an internal thread 21 near its outer end which receives the external thread 22 of a ring or bezel 23. This ring 23 serves to hold the lens 24 (which may be made of "Lucite" or the like) against the flange 25 of a reflector 26. An internal centrally disposed boss 27 cast integral with the head H is provided with a bore 28 to receive the shank 29 of an electric lamp 30. The lamp 30, commonly called "pre-focused," has a flange 31 which is held between the horizontal surface of the boss 27 and the inner flanged end of the reflector 26 when the bezel 23 is screwed home within the head H.

From the description thus far given it will be apparent that the head H is assembled by inserting the shank 29 of the lamp 30 within the bore 28 until its flange 31 comes to rest upon the horizontal surface of the said boss 27. Then the opening 26ª of a reflector 26 is inserted over the lamp 30, the lens then being placed upon the reflector and finally the bezel or ring 23 screwed into the head which effectively retains these parts in rigid relation relative to one another. In order to complete the electrical connection to the lamp 30 the head H is screwed down upon the cell unit C until the cap 32 contacts the central electrode 33 of lamp 30 which completes the circuit. To facilitate turning of the head H relative to the cell unit C, ribs or fluted projections 34 may be formed on the head. The flutes also serve to prevent the flashlight from rolling when placed upon any level surface such as a desk, table top or the like. The movement of the head axially relative to the cell unit constitutes the switch which makes and breaks the circuit to the lamp.

Means for preventing accidental rotation of the head H upon the cell unit C will now be described. A coil spring 34ª shown in detail in Fig. 4 has its ends bent at right angles to its convolutions to supply vertical projections 35 and 36. This spring is received within a recess 37 formed internally of the boss 27 and its projection 35 is passed through a hole 38 in said boss and made fast thereto, as clearly shown in Fig. 2, while the projecting portion 36 bears against the metal disk or cover 13 and engages the radially spaced depressions 14 thereof. The construction is such that when the head H is intentionally rotated upon the cell unit C, the projection 36 of the spring 34ª will ride in and out of the depressions 14 of the disk 13, but the tension of the spring 34ª is sufficient to maintain the projection 36 within one of the depressions 14 to prevent accidental rotation of the head upon the cell unit.

Should the head H be screwed entirely home upon the cell unit C or until the flange 10ª of container 10 bears against the shoulder 40, no damage to the lamp 30 will take place due to the fact that when the cap 32 contacts the electrode 33 any further movement of the head upon the cell unit C will merely compress the spring 18 between the dry cells 11 and 12.

From the foregoing description, it will be seen that I have provided a unique flashlight construction the cell unit C of which may be readily attached or detached from the head H and which cell unit can be discarded when the dry cells are no longer useful and replaced by a new cell unit without the trouble of removing the dry cells from the container 10 inasmuch as this is all part of one unit. The exterior of the container 10 may be given any desired finish so as to match the head H or in contrast therewith as has recently become the accepted practice. Furthermore, while I have shown and described the head H as consisting of a metal casting, I wish to point out that it may be desirable to mold it from plastic, in which event an electrical conductor would be necessary within the head to conduct the current from the shank 29 of the lamp 30 to the cell unit C.

In Figs. 6 to 8 inclusive, I have disclosed a slightly modified form of flashlight and battery unit therefor which comprises essentially a flashlight head indicated generally by the reference character H' and a dry cell battery unit indicated generally by the reference character C'. The dry cell unit or battery C' comprises an outer metal casing 50 which is preferably cylindrical in shape and formed from a single piece of flat stock the meeting edges of which are seamed together as indicated at 51. The outer casing is preferably of a length to receive two or more dry cells indicated by the reference characters 52 and 53. These dry cells are of the same construction as shown in the form of my invention disclosed in Figs. 1 to 5 inclusive. The cell 52 has thereon an insulating jacket 54 formed of paper or the like and the cell 53 has thereon an insulating jacket 55 formed of similar material. The carbon electrode 56 of the bottom cell projects upwardly beyond the top of the casing and has an opening therein which receives one end of a coil spring 57. The opposite end of the coil spring 57 bears against the bottom of the cell 52. Each cell comprises a zinc cup 58 which contains a mass of mix 59 which is insulated therefrom by a paper liner 60. The uppermost cell contains a carbon electrode 61 and surrounding the carbon electrode are a pair of washers 62 and 63. The upper end of the zinc cup is turned over inwardly as indicated at 64 and is embedded in a mass of sealing material 65. Fitting over the layer of sealing material is a metal washer or disk 66 the outer peripheral edge of which rests upon the top of the container C'. The disk has a central opening therein the peripheral edge of which is deflected inwardly as indicated at 67. The mass of sealing material extends a slight distance above the metal disk at the central portion thereof. An apertured metal cap 68 fits over the top of the carbon electrode 61. The bottom end of the container C' has its peripheral edge turned over inwardly as indicated at 69. The cell unit C' is preferably assembled as follows: the dry cell 53 is first inserted therein and rests upon the inturned peripheral edge 69, the coil spring 57 being first inserted into the hole provided in the upper end of the carbon electrode and cap 68. The cell 52 is then inserted in the position shown in Fig. 6 with its zinc bottom engaging the spring 57. A slight pressure is then exerted upon the uppermost cell 52 so as to move it toward the cell 53 and to place the spring 57 under slight tension. With the cells held in this position the upper end of the outer casing 50 is spun over inwardly as indicated at 70, so as to hold the cells within the outer casing. It will be noted that the bottom of the lowermost cell has intimate contact with the inturned portion 69 of the outer casing. The upper end of the outer casing C' is provided with threaded portions 71 which are slightly spaced apart as indicated in Fig. 8. These threaded portions are preferably formed on the metal blank from which a container is formed before it is formed into a tube.

The flashlight head H' is preferably in the form of a molded casting formed of "Bakelite" or some other suitable plastic. The head is generally circular in shape and is provided with a plurality of vertically extending ribs or projections 72 which serve to prevent the flashlight from rolling on a flat surface and serve as a convenient means for turning the head. The lower end of the head is interiorly threaded and engages the spaced threaded portions 71. The upper end of the head is interiorly threaded and receives therein a molded lens 73 preferably formed of "Lucite" or the like and which has a thread formed thereon engaging the interior threads of the head. Fitting within the lens is a reflector 74 which has a downwardly extending skirt portion 74ª which is interiorly threaded. Fitting within the reflector is an electric lamp 75 which is held in place by an exteriorly threaded insulating plug 76. Carried by the plug 76 is a metal eyelet 77 and disposed within the plug is a coil spring 78 one end of which bears against the eyelet 77 and the opposite end of which bears against one terminal of the lamp 75. The plug 76 serves to hold the lamp in place and the coil spring 78 provides a resilient mounting for the lamp and serves as an electrical conductor for connecting the lamp terminal with the eyelet 77. Disposed within the flashlight head is a coil spring 79 one end of which bears against the periphery of the overturned upper edge of the casing C' and the opposite end of which bears against the reflector 74. The coil spring 79 serves the dual function of preventing accidental movement of the head with respect to the casing and as an electrical conductor for connecting the casing with the reflector 74 which is grounded to one terminal of the lamp. The construction is such that when the head H' is intentionally rotated counterclockwise upon the cell unit C' the eyelet 57 will be brought into contact with the metal cap 68 on the adjacent carbon electrode with the result that the circuit to the lamp will be made. Movement of the head in the opposite direction will, of course, serve to break the circuit to the lamp.

From the foregoing description it will be seen that the flashlight head can be readily detached from the dry cell battery unit when desired. When the dry cell battery unit is no longer useful it may be discarded and replaced by a new cell unit without the trouble of removing the dry cells from the container. The dry cell battery unit serves of course as a handle for the flashlight. It will be noted that both of the dry cells are mounted for slight movement within the outer casing C' and that the lowermost cell is grounded on the outer casing while the uppermost cell is insulated therefrom. The dry cell battery may, if desired, consist of one or more cells.

It will now be clear that I have provided a flashlight and battery unit therefor which will accomplish the objects of the invention as hereinbefore stated. Various changes may be made in the details of construction and arrangement of parts without departing from the spirit of my invention and the embodiments of the invention herein disclosed are to be considered as illustrative only and not in a limiting sense as the invention in its broader aspect is limited only in accordance with the scope of the appended claims.

This application is a continuation in part of my application Serial No. 327,651, filed April 3, 1940, now Patent No. 2,254,474 dated Sept. 2, 1941.

Having thus described my invention, what I claim is:

1. A flashlight comprising a metal shell, a flashlight head threadedly secured to said metal shell and including an electric lamp and a reflector grounded to one terminal of said lamp, a plurality of electrically connected dry cells arranged within said shell one of which is grounded to said metal shell and the other of which is adapted for connection to the other terminal of said lamp, spring means disposed between said reflector and metal shell preventing accidental movement of said head thereon and forming an electrical connection between said metal shell and one terminal of said lamp, the relative movement between said head and metal shell serving to make and break the circuit to said lamp, said metal shell being in the form of a tube the opposite ends of which are bent over inwardly to hold said cells permanently within said shell.

2. A flashlight comprising a metal shell, a flashlight head threadedly secured to said shell and including an electric lamp and a reflector grounded to one terminal of the said lamp, a plurality of dry cells electrically connected with each other and arranged within said shell, the lowermost cell being grounded to said metal shell and the uppermost cell being adapted for connection to the other terminal of said lamp, spring means disposed between said reflector and metal shell and serving to prevent accidental movement of said head with respect to said shell and forming an electrical connection between said metal shell and said reflector, the relative movement between said head and metal shell serving to make and break the circuit to said lamp, and means carried by said head for preventing injury to said lamp by excessive relative movement between said shell and head, said metal shell constituting a handle for the flashlight and adapted to be discarded as a unit when the cells are exhausted.

3. A flashlight comprising a metal shell, a flashlight head threadedly secured to said shell and including an electric lamp and a reflector grounded to one terminal of the said lamp, a plurality of dry cells electrically connected with each other and arranged within said shell, the lowermost cell being grounded to said metal shell and the uppermost cell being adapted for connection to the other terminal of said lamp, spring means disposed between said reflector and metal shell and serving to prevent accidental movement of said head with respect to said shell and forming an electrical connection between said metal shell and said reflector, the relative movement between said head and metal shell serving to make and break the circuit to said lamp, an insulating plug carried by said reflector and receiving said electric lamp therein, said plug including means for preventing accidental injury to said lamp as a result of excessive relative movement between the flashlight head and metal shell, said metal shell constituting a handle for the flashlight and adapted to be discarded as a unit when the cells are exhausted.

CYRIL P. DEIBEL.